(12) United States Patent
Nakanishi et al.

(10) Patent No.: US 6,425,826 B1
(45) Date of Patent: Jul. 30, 2002

(54) GAME MACHINE AND INFORMATION STORAGE MEDIUM

(75) Inventors: Kensuke Nakanishi, Machida; Yuji Iizuka, Yokohama, both of (JP)

(73) Assignee: Namco, Ltd., Tokyo (JP)

(*) Notice: Subject to any disclaimer, the term of this patent is extended or adjusted under 35 U.S.C. 154(b) by 0 days.

(21) Appl. No.: 09/547,101

(22) Filed: Apr. 11, 2000

(30) Foreign Application Priority Data

Apr. 13, 1999 (JP) .......................................... 11-104946

(51) Int. Cl.⁷ ................................................ A63F 13/00
(52) U.S. Cl. .......................................... 463/31; 345/418
(58) Field of Search .................................. 463/1, 31, 32, 463/33, 34, 36, 30, 43–44; 345/418, 419

(56) References Cited

U.S. PATENT DOCUMENTS

| | | | |
|---|---|---|---|
| 5,577,960 A | | 11/1996 | Sasaki |
| 5,764,232 A | * | 6/1998 | Oouchi .................. 345/419 |
| 5,894,308 A | * | 4/1999 | Isaacs .................... 345/420 |
| 6,018,347 A | * | 1/2000 | Willis ..................... 345/419 |
| 6,078,335 A | * | 6/2000 | Wong et al. ............. 345/430 |
| 6,104,402 A | * | 8/2000 | Goddard et al. ........ 345/419 |
| 6,241,610 B1 | * | 6/2001 | Miyamoto et al. ....... 463/33 |

FOREIGN PATENT DOCUMENTS

JP       WO 96/08298     *   3/1996   ............. A63F/9/22

* cited by examiner

*Primary Examiner*—Joe H. Cheng
*Assistant Examiner*—Kim T. Nguyen
(74) *Attorney, Agent, or Firm*—Oliff & Berridge, PLC

(57) ABSTRACT

A game machine having a plurality of play patterns for a game, the play patterns being different from each other in the numbers of moving-body objects entering the game, for providing images of a highest quality for each play pattern in real time, and an information storage medium suitable for use in such a game machine. The game machine can be used to play a game having a plurality of play patterns which are different from each other in the number of moving-body objects entering the game. In order to generate a more accurate images of moving-body objects for a play pattern having a reduced number of moving-body objects entering the game, the game machine comprises an accuracy setting section for setting the accuracy of moving-body objects for each play pattern and an image generation section for generating images of the moving-body objects based on the accuracy.

44 Claims, 14 Drawing Sheets

FIG. 4A

LOD TABLE

| AREA \ MODE | NORMAL MODE | TIME-ATTACK MODE |
|---|---|---|
| $L_1$ | 1 | 0 |
| $L_2$ | 2 | — |
| $L_3$ | 3 | — |
| $L_4$ | 4 | — |

FIG. 4B

MODELING INFORMATION TABLE

| ACCURACY INFORMATION | CORRESPONDING MODEL INFORMATION |
|---|---|
| 0 | MODELING INFORMATION $M_0$ |
| 1 | MODELING INFORMATION $M_1$ |
| 2 | MODELING INFORMATION $M_2$ |
| 3 | MODELING INFORMATION $M_3$ |

| AREA \ GAME STAGE | GAME STAGE 1 ($n_1$ ENTRIES) | GAME STAGE 2 ($n_2$ ENTRIES) | GAME STAGE 3 ($n_3$ ENTRIES) |
|---|---|---|---|
| $L_1$ | 0 | 1 | 2 |
| $L_2$ | 1 | 2 | 3 |
| $L_3$ | 2 | 3 | 4 |

$n_1 < n_2 < n_3$

| AREA \ GAME STAGE | GAME STAGE 1 ($n_1$ ENTRIES) | GAME STAGE 2 ($n_2$ ENTRIES) | GAME STAGE 3 ($n_3$ ENTRIES) |
|---|---|---|---|
| PLAYER'S MOVING BODY | 0 | 1 | 2 |
| $L_1$ | 2 | 2 | 2 |
| $L_2$ | 3 | 3 | 3 |
| $L_3$ | 4 | 4 | 4 |

| RACE / AREA | PRELIMINARY RACE ($m_1$ ENTRIES) | MAIN RACE ($m_2$ ENTRIES) | FINAL RACE ($m_3$ ENTRIES) |
|---|---|---|---|
| $L_1$ | 2 | 1 | 0 |
| $L_2$ | 3 | 2 | 1 |
| $L_3$ | 4 | 3 | 2 |

$$m_1 > m_2 > m_3$$

GAME MACHINE AND INFORMATION STORAGE MEDIUM

BACKGROUND OF THE INVENTION

1. Field of the Invention

The present invention relates to a game machine and an information storage medium.

2. Description of the Prior Art

There are known many driving games in which players enjoy to control moving bodies such as motorcars or motorcycles. Recently, in such driving games there are often provided a plurality of selectable game modes such as a time-attack mode as well as a competition mode in which each player can enjoy to compete with other players. Moreover, game machines which provides high-quality images in real time for a real driving simulation are being developed.

In these game machines, an object representing a racing car or the like is formed by a plurality of integrated polygons. In such a case, the quality of the image can be improved by increasing the number of polygons in the object.

However, if the number of polygons is increased for all objects to be used, huge amount of data must be processed. A game machine required to provide images in real time has a limited amount of data that can be processed within a given period of time. When such a game machine processes an increased amount of data, it will not properly be able to process the data. For example, the movement of viewpoint may be extremely slow; part of moving picture may be skipped like a stop-motion photography; or many objects may disappear without being displayed.

One technique for solving such a problem is to change the number of polygons for representing display objects according to the distance from the player's viewpoint. In other words, a lot of polygons are used for an object which is nearer from the player's viewpoint, while polygons of the smaller number is used for an object which is far from the player's viewpoint.

According to this technique, in a competition mode for a racing game, for example, a plurality of racing cars may be displayed on a screen when the racing cars crowd before the player's racing car. In this case, all of the racing cars are displayed by objects having very increased number of polygons (or highly detailed objects) since the player's viewpoint is close to the racing cars. This increases the amount of data to be processed in one frame, leading to the aforementioned problem.

On the other hand, there is a time-attack mode in which only one racing car for the player runs, for example. In such a case, it is desirable to provide a high-quality images representing the player's racing car by using a highly detailed object, since there is no trouble caused by crowded racing cars.

SUMMARY OF THE INVENTION

It is therefore an objective of the present invention to simply provide a game machine having a plurality of play patterns for a game, the play patterns being different from each other in the numbers of moving-body objects entering the game, for providing images of a highest quality for each play pattern in real time, and also provide an information storage medium suitable for use in such a game machine.

(1) According to a first aspect of the present invention, there is provided a game machine having a plurality of play patterns for a game, the play patterns being different from each other in the number of moving-body objects used in the game, comprising:

an accuracy setting means for setting the accuracy of the moving-body objects for each of the play patterns, so that more accurate images of the moving-body objects are generated in a play pattern which has a less number of the moving-body objects in the game; and an image generation means for generating images of the moving-body objects based on the accuracy of the moving-body objects set for each of the play patterns.

According to a second aspect of the present invention, there is provided a computer-readable information storage medium having a program for implementing the above-described means. As an example of the program, there is a computer-usable program (including a program embodied in a carrier wave) which has a processing routine for implementing the above-described means.

Objects entering the game are not necessarily displayed on a screen. For example, when the number of moving bodies entering a race is N, the number of moving-body objects entering the game becomes N, even if the number of moving-body objects displayed on the screen is M.

The play pattern is determined by the number of moving-body objects in both of the single-player and the multi-player game. For example, when the single-player game has the competition and time-attack modes, if these modes are different in the number of moving-body objects entering the game, it can be the that they have different play patterns. When the moving-body objects corresponding the number of players entering the multi-player game enter that game, the play pattern will be determined by the number of entering players.

When the game machine is used for a game having a plurality of game stages which are different from each other in the number of moving-body objects in each game stage, it can be considered that the play pattern is determined for each game stage.

If a plurality of races such as preliminary race, semifinal race and final race are performed in the same game stage with the number of moving-body objects being different from one race to the other, it can be considered that the play patterns for these races are also different from each other.

Alternatively, the same accuracy may be set for a given range of the number of moving-body objects. In this case, it can be considered that the play patterns are different if the number of moving-body objects thereof are not within the same range.

A highly detailed image having details represented by an increased number of polygons is considered an accurate image.

In this way, when there is a plurality of play patterns which are different from each other in the number of moving-body objects entering the game, the accuracy of the moving-body objects can be set for each play pattern.

Therefore, the present invention can simply provide a game machine having a plurality of play patterns for a game, the play patterns being different from each other in the numbers of moving-body objects entering the game, for providing images of a highest quality for each play pattern in real time, and also provide an information storage medium suitable for use in such a game machine.

Note that the image generation means may generate a more accurate image of the player's moving body in a play pattern which has a less number of the moving-body objects in the game, when the play patterns are the same in the distances between a virtual camera and the moving-body objects.

(2) In the game machine, information storage medium and program relating to the present invention, the accuracy setting means may set the accuracy of a player's moving body for each of the play patterns, so that a more accurate image of the player's moving body can be generated in a play pattern which has a less number of the moving-body objects in the game; and the image generation means may generate a more accurate image of the player's moving body in a play pattern which has a less number of the moving-body objects in the game, when the play patterns are the same in the distances between a player's viewpoint and the moving-body objects.

When game images viewed from the third person's viewpoint is to be represented, a player's moving body is usually closest to the virtual camera. Therefore, the quality of the game images depends on the accuracy of the player's moving body.

In this way, the optimum accuracy for the player's moving body can be set for each play pattern in accordance with the number of the moving-body objects entering the game.

(3) According to a third aspect of the present invention, there is provided a game machine having a plurality of play patterns for a game, the play patterns being different from each other in the number of moving-body objects used in the game, comprising:

a storage means for storing a plurality of items of modeling information which are different from each other in the accuracy of the moving-body objects; and an image generation means for generating images of the moving-body objects by using an item of more accurate modeling information in a play pattern which has a less number of the moving-body objects in the game.

According to the fourth aspect of the present invention, there is provided a computer-readable information storage medium having a program for implementing the above-described means. As an example of the program, there is a computer-usable program (including a program embodied in a carrier wave) which has a processing routine for implementing the above-described means.

When polygon models are used for example, a plurality of items of modeling information which are different from each other in the accuracy of the moving-body objects are also different from each other in the number of polygons for representing the same moving-body object.

When there are a plurality of play patterns for a game, the play patterns being different from each other in the number of moving-body objects used in the game, images of the moving-body objects can be generated by using an item of more accurate modeling information in a play pattern which has a less number of the moving-body objects in the game.

Therefore, the present invention can simply provide a game machine having a plurality of play patterns for a game, the play patterns being different from each other in the numbers of moving-body objects entering the game, for providing images of a highest quality for each play pattern in real time, and also provide an information storage medium suitable for use in such a game machine.

(4) In the game machine, information storage medium and program relating to the present invention, the image generation means may generate an image of a player's moving body by using an item of more accurate modeling information in a play pattern which has a less number of the moving-body objects in the game.

In this way, the optimum accuracy for the player's moving body can be set for each play pattern in accordance with the number of the moving-body objects entering the game.

(5) The game machine, information storage medium and program relating to the present invention, may further comprise a selecting means for selecting a desired play pattern from the plurality of play patterns for the game.

Such a selection means may be applied in a case where a player selects a desired race among a plurality of races which are different from each other in the numbers of racing cars in a race, for example. Moreover, in a driving game or the like in which either of the time-attack mode or competition mode can be selected, the selection means can be applied.

In this way, images of the moving-body objects having the optimum accuracy can be generated for the play pattern selected by the player.

(6) The game machine may enable a player to play a multi-player game, and generate more accurate images of the moving-body objects in the multi-player game which has less number of players.

For example, if in the multi-player game, the number of moving-body objects entering the game is determined by the number of players entering the game, the play pattern is determined by the number of players. In such a case, more accurate images of the moving-body objects can be generated for a less number of players entering the multi-player game.

In this way, images of the moving-body objects having the optimum accuracy can be generated in accordance with the number of players entering the multi-player game.

(7) According to a fifth aspect of the present invention, there is provided a game machine which provides a plurality of game spaces for a game, the game spaces being different from each other in the number of objects representing the same thing, comprising:

an accuracy setting means for setting the accuracy of the objects representing the same thing for each of the game spaces in accordance with the number of the objects representing the same thing; and an image generation means for generating images of the objects representing the same thing based on the accuracy of the objects set for each of the game spaces, wherein the image generation means generates more accurate images of the objects representing the same thing disposed in one of the game spaces which has less number of objects representing the same thing.

According to the sixth aspect of the present invention, there is provided a computer-readable information storage medium having a program for implementing the above-described means. As an example of the program, there is a computer-usable program (including a program embodied in a carrier wave) which has a processing routine for implementing the above-described means.

When there is a game machine which provides a plurality of game spaces for a game, the game spaces being different from each other in the number of objects representing the same thing, the accuracy of the objects representing the same thing can be set for each of the game spaces in accordance with the number of the objects representing the same thing.

Therefore, the present invention can simply provide a game machine for providing images of a highest quality for each game space in real time, and also provide an information storage medium suitable for use in such a game machine.

(8) In the game machine, information storage medium and program relating to the present invention, the image generation means may generate a more accurate image of an object by using a model which has a larger number of polygons selected from among a plurality of models which are used to generate objects representing the same thing and are different from each other in the number of polygons.

According to the present invention, when generating images of objects by using polygon models, a game machine for providing images of a highest quality for each play pattern or each game space in real time, and also an information storage medium suitable for use in such a game machine can be simply provided.

BRIEF DESCRIPTION OF THE DRAWINGS

FIGS. 4A and 4B show tables for illustrating an example of an LOD control based on the number of moving-body objects in a game.

FIG. 14 shows a table for describing the setting of accuracy for a game stage having a plurality of play patterns.

DESCRIPTION OF THE PREFERRED EMBODIMENTS

A preferred embodiment of the present invention will now be described in detail with reference to the drawings. Although this embodiment will be described as to a motorcycle game to which the present invention is applied, it is to be understood that the present invention is not limited to such a motorcycle game, but may also be applied to various types of game machines for other games.

Figure 1:
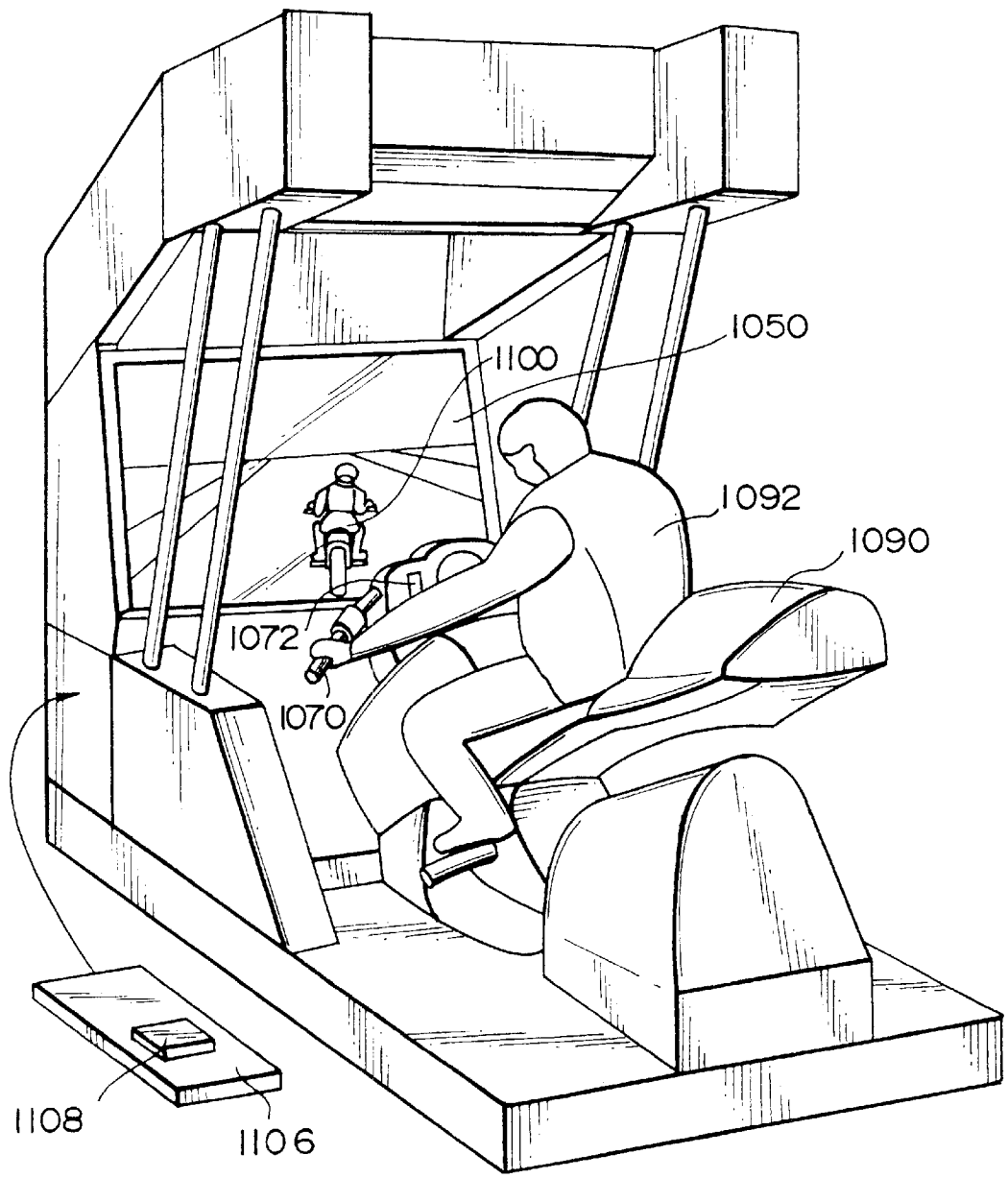
FIG. 1 shows a schematic perspective view of the embodiment of the game machine of the present invention.

FIG. 1 schematically shows the appearance of a game machine of this embodiment.

The game machine of this embodiment comprises an imitation racing motorcycle 1090 and a display 1050 disposed in front of the imitation racing motorcycle.

A player 1092 on the imitation racing motorcycle 1090 can operate a handlebar 1070, a throttle and a brake lever and also tilt the imitation racing motorcycle 1090, while viewing a game picture displayed on the display 1050. As the player 1092 controls the throttle or the brake lever, a moving body (or motorcycle) 1100 on the display 1050 will be accelerated or decelerated. When the player 1092 operates the handlebar 1070 and tilts the imitation racing motorcycle 1090, the moving body 1100 will be turned right or left and tilted right or left.

The imitation racing motorcycle 1090 is tiltable in the rightward and leftward directions. As the player 1092 on the imitation racing motorcycle 1090 moves its weight rightward or leftward, the imitation racing motorcycle will be tilted rightward or leftward. Thus, the player can control the motorcycle running in the game space.

When the imitation racing motorcycle 1090 is tilted rightward or leftward, a restoring force corresponding to the speed of the player's motorcycle in the game space is provided to the imitation racing motorcycle 1090 as a reaction force toward its neutral position. Thus, the player can get a control feeling similar to that of an actual motorcycle and also feel such a difficulty of control as in the actual racing motorcycle.

Figure 2:
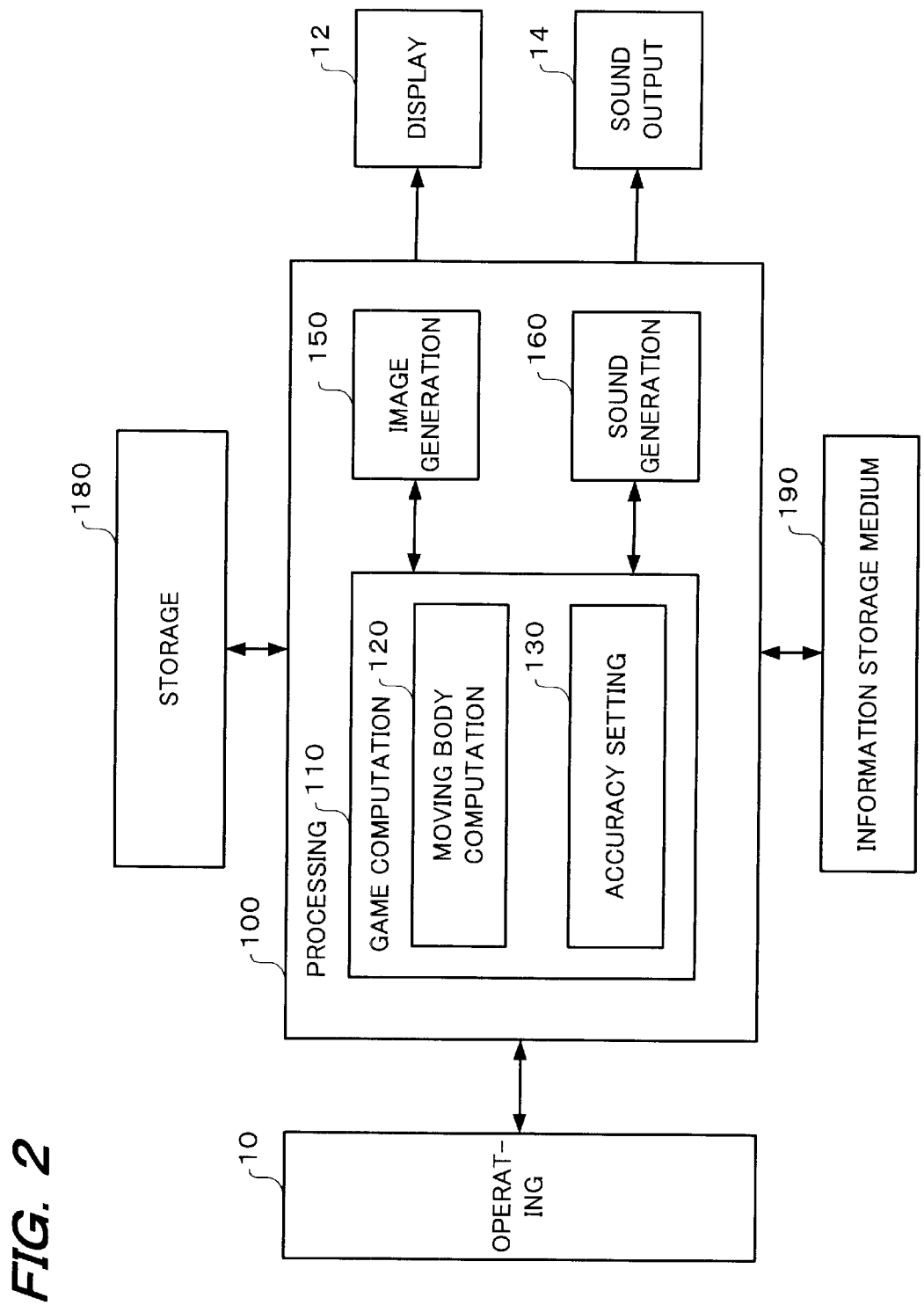
FIG. 2 shows a functional block diagram of the embodiment of the game machine of the present invention.

FIG. 2 shows a functional block diagram of the game machine of this embodiment.

An operating section 10 is used by the player to input operation information. The functions of the operating section 10 can be implemented by hardware such as the handlebar 1070, the throttle, the brake lever and the imitation racing motorcycle 1090 as shown in FIG. 1.

A processing section 100 performs various processings such as controlling the entire machine, indication to any section in the machine, or game computation. The functions of the processing section 100 can be realized by hardware such as CPU (CISC or RISC type), DSP, ASIC (such as a gate array), or a given program (or game program).

A storage section 180 provides a working area for the processing section 100, for example. The functions of the storage section 180 can be implemented by hardware such as RAM.

A computer-readable information storage medium 190 stores the program or data. The functions of the information storage medium 190 can be implemented by hardware such as an optical disk (CD-ROM or DVD), a magneto-optical disk (MO), a magnetic disk, a hard disk, a magnetic tape, a portable information storage (a memory card, a PDA, a portable game device and a game cassette), or a semiconductor memory (ROM). The processing section 100 performs various processing steps based on the program or data stored in the information storage medium 190.

A part or all of the information stored in the information storage medium 190 will be transferred to the storage section 180 when the system is powered on.

The processing section 100 comprises a game computation section 110, an image generation section 150 and a sound generation section 160.

According to the operational information from the operating section 10 and a game program, the game computation section 110 performs various processing such as receiving a coin (or game charge), setting the game mode, advancing the game, setting for the selection screen, determining the position and direction of a moving body (for example, motorcycle, character, robot, motorcar, tank, aircraft, space ship, watercraft, boat, ski board, surf board, ball, bullet or the like), determining the viewpoint and direction of view, re-producing the motion of the moving body, disposing objects in an object space, checking hits, computing the results (records) of game, setting for a plurality of players to play in a common game space, and terminating the game.

The image generation section 150 generates game images according to the game computation by the game computation section 110. In this embodiment, an image of a motorcycle which is a moving-body object is generated based on the modeling information corresponding to the accuracy that has been set by an accuracy setting section 130. It is to be noted that as the accuracy increases, the generation of image is carried out by using a model having a larger number of polygons.

The sound generation section 160 generates a game sound according to the game computation by the game computation section 110. The game sound generated by the sound generation section 160 is outputted through a sound output section 14.

The game computation section 110 comprises a moving body computation section 120 and an accuracy setting section 130.

The moving body computation section 120 performs processing for moving the moving body within the object space, based on the operation information from the operating section 10 or a given program. In other words, the moving body computation section 120 performs processing for moving the moving body within the object space, based on the operation information from the players or the instructions from the computer (or a given movement control algorithm).

More particularly, the moving body computation section 120 performs processing for determining the position and direction of the moving body for each 1 frame (or 1/60 seconds), for example. It is now assumed that the position of the moving body in (k−1) frame is $PM_{k-1}$, the speed thereof being $VM_{k-1}$, the acceleration of the same is $AM_{k-1}$ and the time period of 1 frame is $\Delta t$. Thus, the position $PM_k$ and speed $VM_k$ of the moving body in k frame can be obtained by the following equations:

$$PM_k = PM_{k-1} + VM_{k-1} \times \Delta t \quad (1)$$

$$VM_k = VM_{k-1} + AM_{k-1} \times \Delta t \quad (2)$$

The accuracy setting section 130 sets the accuracy of a moving-body object for each play pattern such that a more accurate image of the moving-body object will be generated for a play pattern having a less number of moving-body objects in the game.

A feature of this embodiment will be described below. In the game machine of this embodiment, either of the normal or time-attack mode is selected when the game is started.

In the normal mode, a player's motorcycle competes against the other players' motorcycles. In the normal mode, N of motorcycles including the player's motorcycle enter a race. The normal mode uses N motorcycles as moving-body objects entering the game. In the multi-player game, other player's motorcycles are included in the N motorcycles. If the total number of all players' motorcycles entering the multi-player game is less than N, the computer will add additional motorcycles to provide the total number of motorcycles equal to N.

In the time-attack mode, only the player's motorcycle challenges the course time. only one player's motorcycle is a moving-body object entering the game.

In such a manner, this embodiment provides two play patterns which are different from each other in the number of the moving-body objects in the game. Any one of these modes can be selected by the player. As the number of moving-body objects entering the game is smaller, more accurate images of the moving-body objects are generated.

Figure 3:
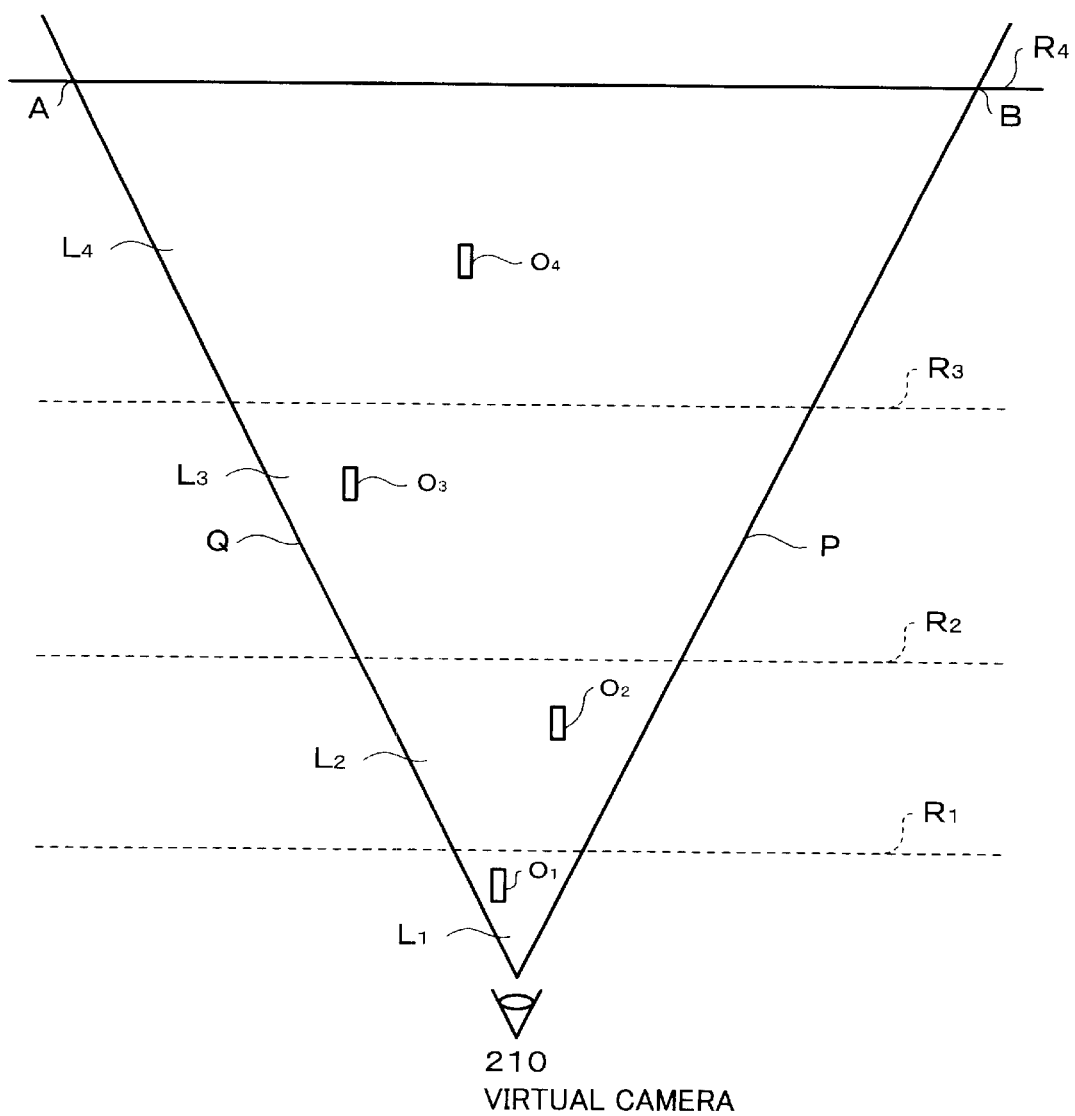
FIG. 3 illustrates the positional relationship between a virtual camera and moving-body objects.

FIG. 3 illustrates the positional relationship between a virtual camera and moving-body objects. An area to be displayed on the screen is a triangular OAB area that is surrounded by a range of vision determined by lines P and Q and a range of depth determined by a line $R_4$. Areas $L_1$, $L_2$, $L_3$ and $L_4$ are defined by one of lines $R_1$, $R_2$, $R_3$ and $R_4$, and lines P and Q when the respective distances from the virtual camera 210 are represented by $R_1 < R_2 < R_3 < R_4$.

It is now assumed that objects $O_1$, $O_2$, $O_3$ and $O_4$ are in the areas $L_1$, $L_2$, $L_3$ and $L_4$, respectively. In general, an object spaced apart from the virtual camera by a farther distance will be displayed smaller. Therefore, the objects $O_1$, $O_2$, $O_3$ and $O_4$ will be displayed smaller in the order described.

FIGS. 4A and 4B illustrate an level of detail (LOD) control based on the number of the moving-body objects entering the game.

FIG. 4A shows an example of an LOD table in which the accuracies set for the normal and time-attack modes are stored. In the normal mode, the accuracy for the area $L_1$ is set to 1; the accuracy for the area $L_2$ is set to 2; the accuracy for the area $L_3$ is set to 3; and the accuracy for the area $L_4$ is set to 4.

In the time-attack mode, only one player's motorcycle viewed from the third-person viewpoints is displayed on the screen. In this case, the virtual camera is disposed near and behind the player's motorcycle. Thus, the player's motorcycle will be within the area $L_1$, most close to the virtual camera. In this embodiment, the accuracy of the player's motorcycle is set to 0 in the time-attack mode.

FIG. 4B shows an example of a table storing the modeling information corresponding to the accuracy information described above.

Each item of modeling information includes polygon information (including vertex information and mesh information), texture information or pointers to the area in which these information items are stored.

If the accuracy is 0 as shown in FIG. 4B, an image is generated by using a modeling information $M_0$. If the accuracy is 1, an image is generated by using a modeling information $M_1$. If the accuracy is 2, an image is generated by using a modeling information $M_2$. If the accuracy is 3, an image is generated by using a modeling information $M_3$.

FIGS. 5 to 9 show polygon models for a motorcycle generated according to the respective items of modeling information $M_0$ to $M_4$. A polygon model generated from the modeling information $M_0$ is an object having a great number of polygons (or highest detailed object), as can be seen from FIG. 5. A polygon model generated from the modeling information $M_1$ is an object having the number of polygons slightly smaller than that of FIG. 5 (or slightly high detailed object), as can be seen from FIG. 6. A polygon model generated from the modeling information $M_2$ is an object having a number of polygons further smaller than that of FIG. 6 (middle detailed object), as can be seen from FIG. 7. A polygon model generated from the modeling information $M_3$ is an object having a number of polygons further smaller than that of FIG. 7 (or slightly low detailed object), as can be seen from FIG. 8. A polygon model generated from the modeling information $M_4$ is an object having a number of polygons further smaller than that of FIG. 8 (or lowest detailed object), as can be seen from FIG. 9.

Figure 6:
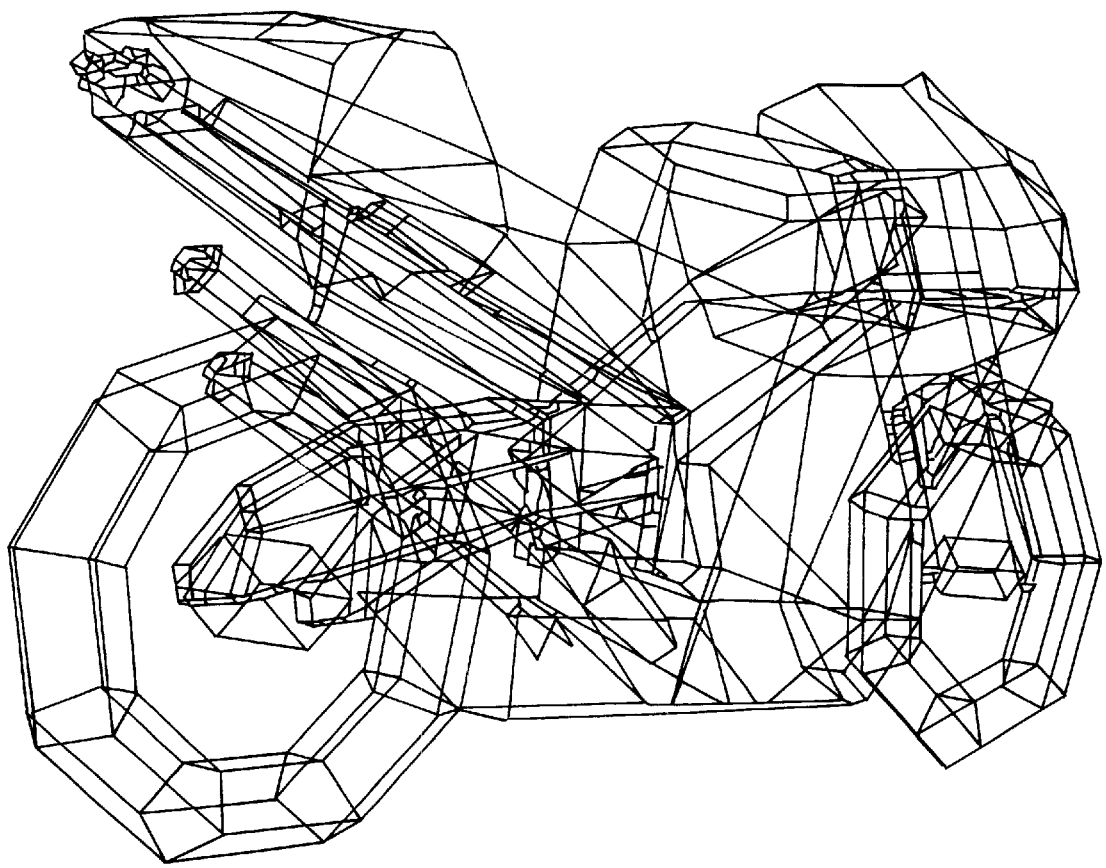
FIG. 6 shows a polygon model generated by the modeling information $M_1$.
Figure 7:
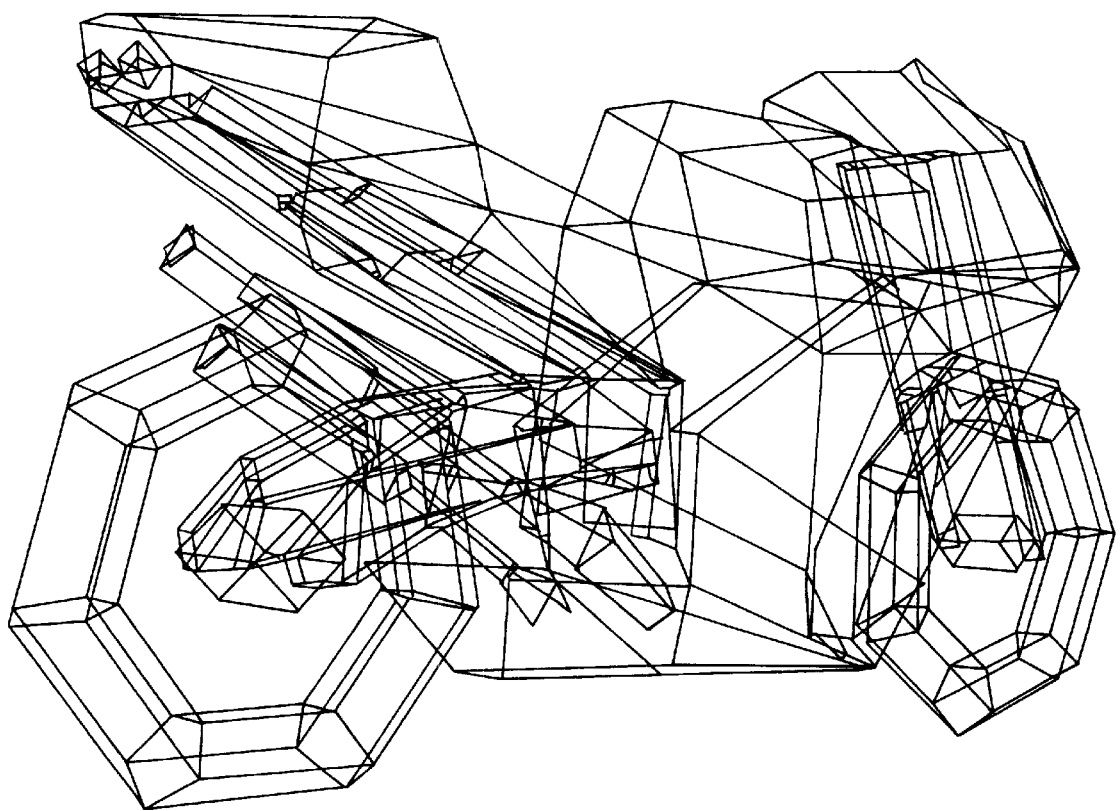
FIG. 7 shows a polygon model generated by the modeling information $M_2$.
Figure 8:
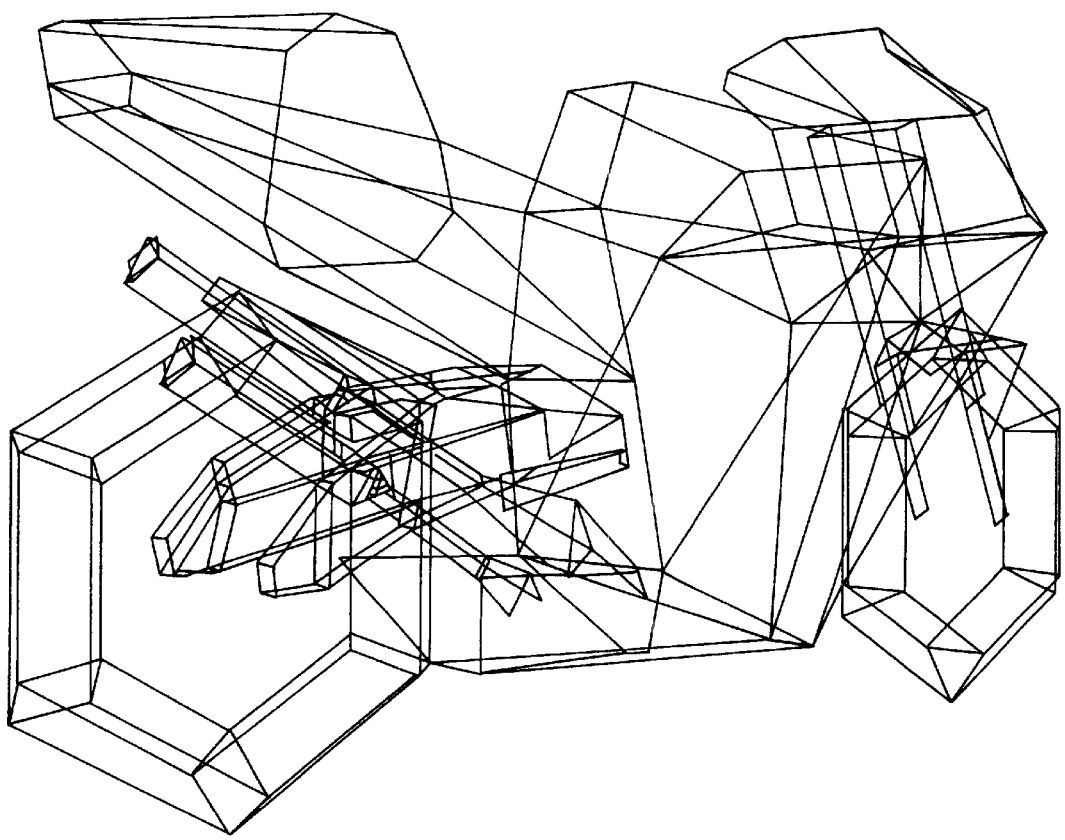
FIG. 8 shows a polygon model generated by the modeling information $M_3$.
Figure 9:
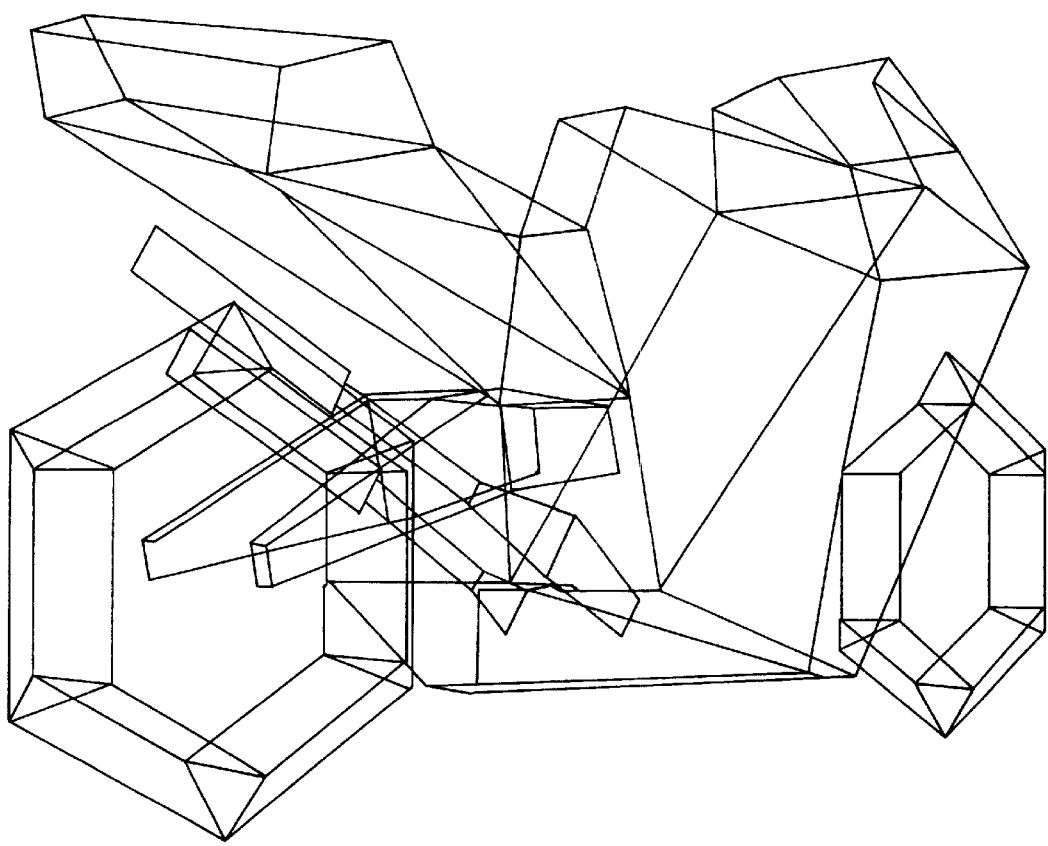
FIG. 9 shows a polygon model generated by the modeling information $M_4$.

If a moving-body object viewed from the third-person viewpoints in the normal mode is arranged as shown in FIG. 3 (in this case, object $O_1$ represents the player's moving body), object $O_1$ is formed into an image as a slightly high detailed object, using such a polygon model as shown in FIG. 6. Similarly, object $O_2$ is formed into an image as a middle detailed object, using such a polygon model as shown in FIG. 7. Object $O_3$ is formed into an image as a slightly low detailed object, using such a polygon model as shown in FIG. 8. Object $O_4$ is formed into an image as a lowest detailed object, using such a polygon model as shown in FIG. 9.

Figure 5:
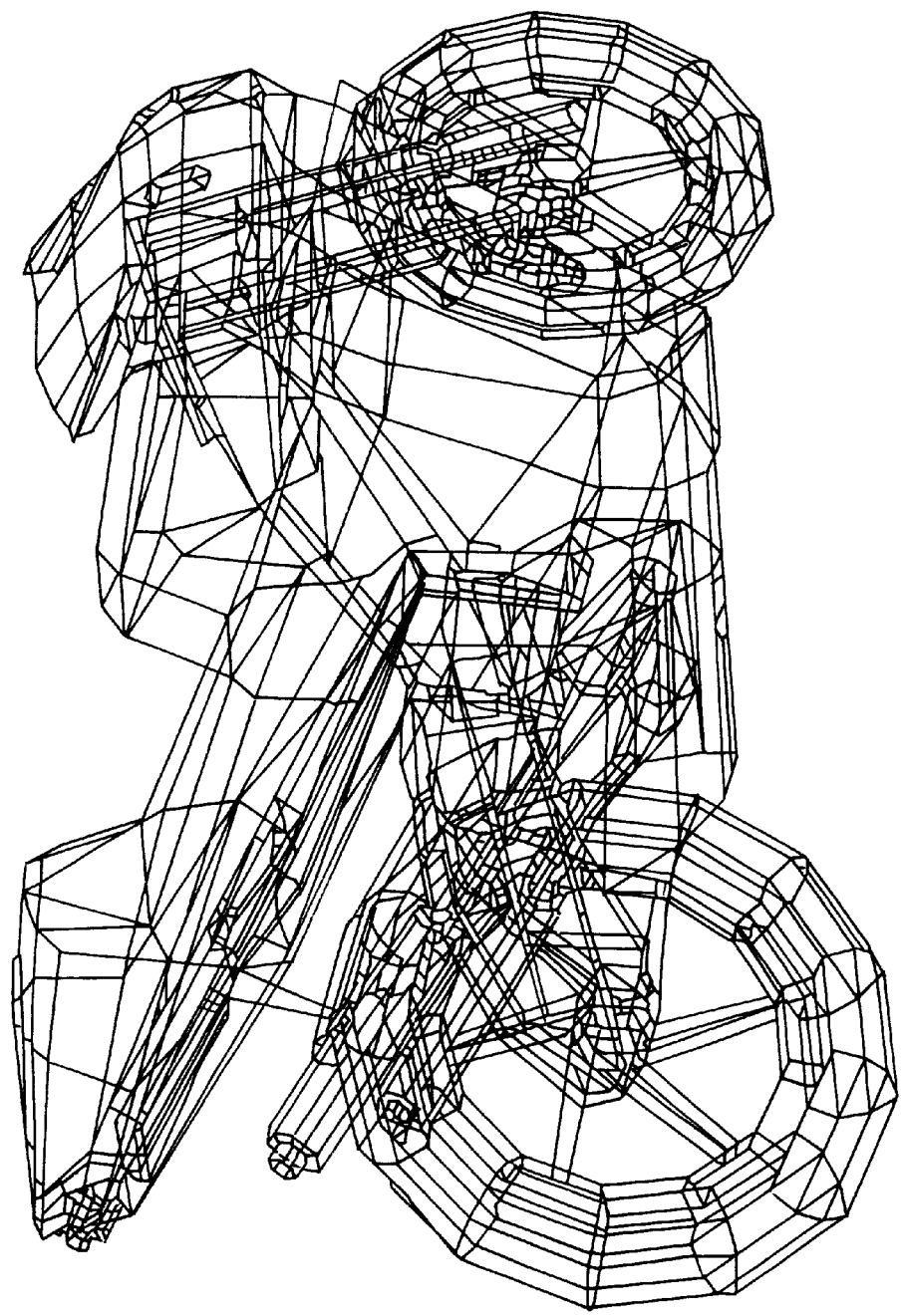
FIG. 5 shows a polygon model generated by the modeling information $M_0$.

The player's motorcycle viewed from the third-person viewpoints in the time-attack mode is formed into an image as a highest detailed object, using such a polygon model as shown in FIG. 5.

In this embodiment, the normal mode in which the number of moving-body objects entering the game is larger uses models having their accuracies lower than that of the time-attack mode in which the number of moving-body objects entering the game is smaller. Thus, the number of polygons to be processed can be suppressed even though the number of motorcycles entering the game is larger as in the normal mode. This can prevent the occurrence of any trouble due to the increase of the processing burden.

Since only one motorcycle is displayed on the screen in the time-attack mode, the processing burden will not be increased sufficient to affect the real-time image generating process even if a model having an increased number of polygons is used. Thus, the time-attack mode generates an image of motorcycle as a highest detailed object using a model having the largest number of polygons.

In this embodiment, therefore, even if the distance between the virtual camera and an object in the time-attack mode is the same as the distance between the virtual camera and the object in the normal mode, a more accurate image will be generated in the time-attack mode.

According to this embodiment, the requirements of preventing the occurrence of trouble due to the increase of the processing burden and providing a high-quality image can simply and easily be satisfied by variably setting the accuracy for each game mode according to the number of moving-body objects entering the game.

Figure 10:
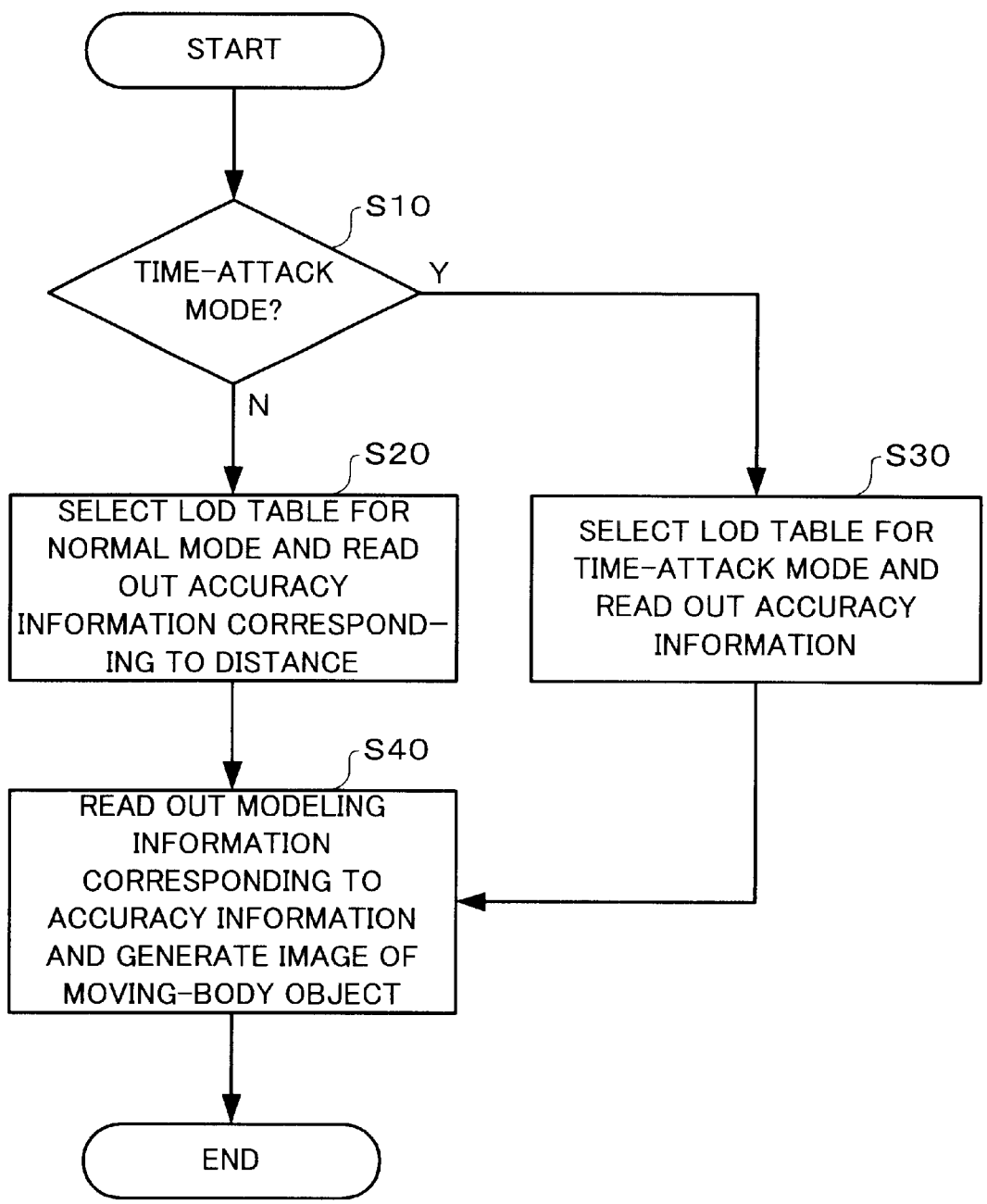
FIG. 10 shows a flowchart for describing an operation of LOD control in the embodiment of the present invention.

FIG. 10 is a flowchart illustrating an example of the operation of an LOD control in this embodiment.

It is first judged whether the present mode is the time-attack mode. If the present mode is the time-attack mode, an LOD table corresponding to the time-attack mode is selected to read out the information of accuracy (steps S10 and S30). If the present mode is not the time-attack mode, an LOD table corresponding to the normal made is selected to read out the information of accuracy according to the distance between the virtual camera and an object (steps S10 and S20).

The modeling information corresponding to the read accuracy information is then read out to generate an image of moving-body object (step S40).

Figure 11:
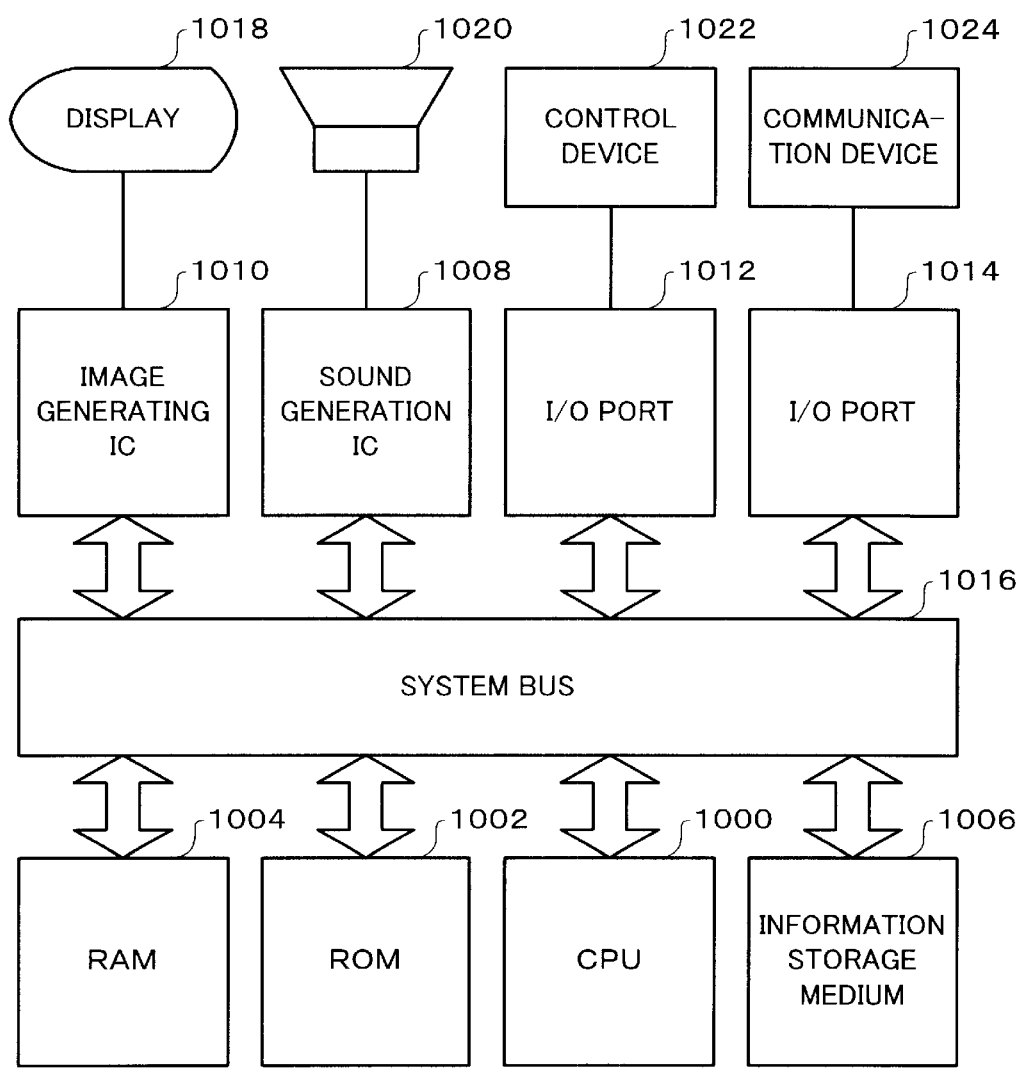
FIG. 11 shows an example of a hardware configuration for implementing this embodiment of the present invention.

A structure of hardware which can implement this embodiment will be described with reference to FIG. 11. The structure shown in FIG. 11 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 mainly stores a program, image data and sound data for representing objects, and others. For example, a domestic game machine may use CD-ROM, game cassette, DVD or the like as an information storage medium for storing the game program and other data. An arcade game machine may use a memory such as ROM. In this case, the information storage medium 1006 is in the form of ROM 1002.

The control device 1022 corresponds to a game controller, control panel or the like. The control device 1022 is used by the player for inputting his or her judgment during the game into the game machine.

CPU 1000 performs control of the entire game machine and processing of data according to the program stored in the information storage medium 1006, the system program (such as initialization information for the machine) stored in the ROM 1002, signals inputted through the control device 1022 and so on. RAM 1004 is a memory means used as a working area for the CPU 1000 and stores given contents in the information storage medium 1006 and ROM 1002 or the results of computation by the CPU 1000. The structures of data having a logical structure for implementing this embodiment is formed on this RAM or information storage medium.

The sound and image generation IC's 1008, 1010 in this game machine are to output game sounds and images in a preferred manner. The sound generation IC 1008 is an integrated circuit for generating game sounds such as sound effects and background music, based on the information stored in the information storage medium 1006 and ROM 1002. The generated sounds are outputted through the speaker 1020. The image generation IC 1010 is an integrated circuit for generating pixel information to be outputted toward the display 1018 based on the image information from the information storage medium 1006 and so on. The display 1018 may be in the form of a so-called head mount display (HMD).

The communication device 1024 receives and transmits information which is utilized in the game machine from and to external. The communication device 1024 is connected to the other game machine (or machines) to transmit and receive given information corresponding to a game program from and to the other game machines or utilized to transmit and receive information including a game program and other data through a communication line.

Various processing steps illustrated in connection with FIGS. 1 to 10 are implemented by the components such as the information storage medium 1006 having a program for performing the processing shown in the flow chart of FIG. 10, the CPU 1000 operated according to the program, image generation IC 1010 and sound generation IC 1008. The processing in the image generation IC 1010 and sound generation IC 1008 may be performed in a software manner through the CPU 1000 or all-purpose DSP or the like.

Where this embodiment is applied to an arcade game machine as shown in FIG. 1, a system board (or circuit board) 1106 in the game machine comprises a CPU, an image generation IC, a sound generation IC and others all of which are mounted therein. Based on at least one of the operational information from the player and instruction from the computer, a semiconductor memory 1108 which is an information storage medium on the system board 1106 stores information for performing the computation for movement of the moving bodies within the object space; information for setting the accuracy of a moving-body object for each play pattern such that a more accurate image of moving-body object will be generated for a play pattern having a reduced number of moving-body objects entering the game; information for generating an image including the moving-body objects based on the accuracies for moving-body objects set for each play pattern; and other information. This information will be referred to "stored information". The stored information includes at least one item of information selected from program codes for performing the processing of the present invention, image information, sound information, information of object shape; table data; list data; player information; information for instructing the processing of the present invention; information for performing the processing according to the instructions; and so on.

Figure 12A:
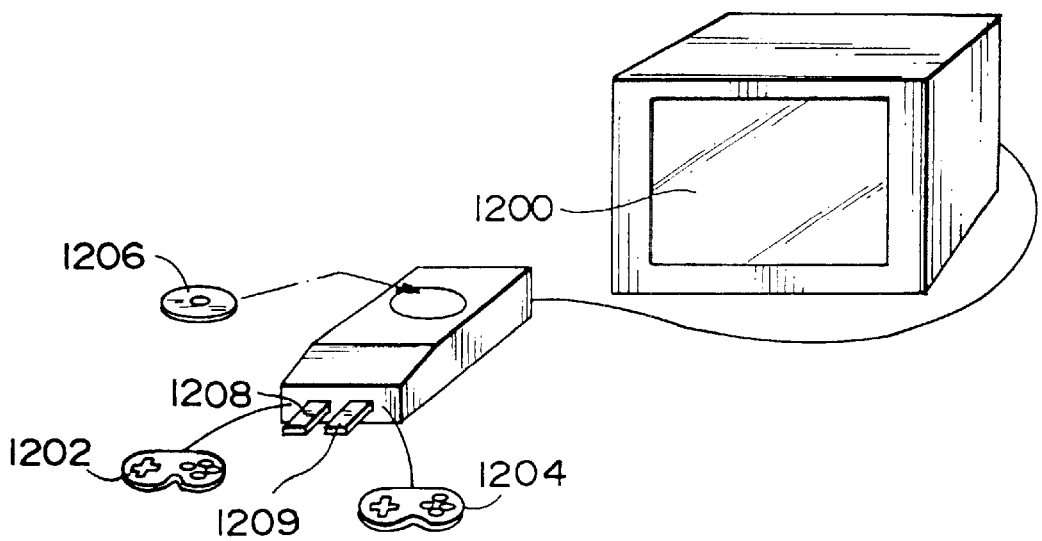
FIGS. 12A and 12B show examples of various types of system to which this invention is applied.

FIG. 12A shows a domestic game machine to which this embodiment is applied. A player enjoys a game by manipulating game controllers 1202 and 1204 while viewing a game picture displayed on a display 1200. In such a case, the aforementioned stored information is stored in CD-ROM 1206 and memory cards 1208, 1209 which are detachable information storage media to the game machine body.

Figure 12B:
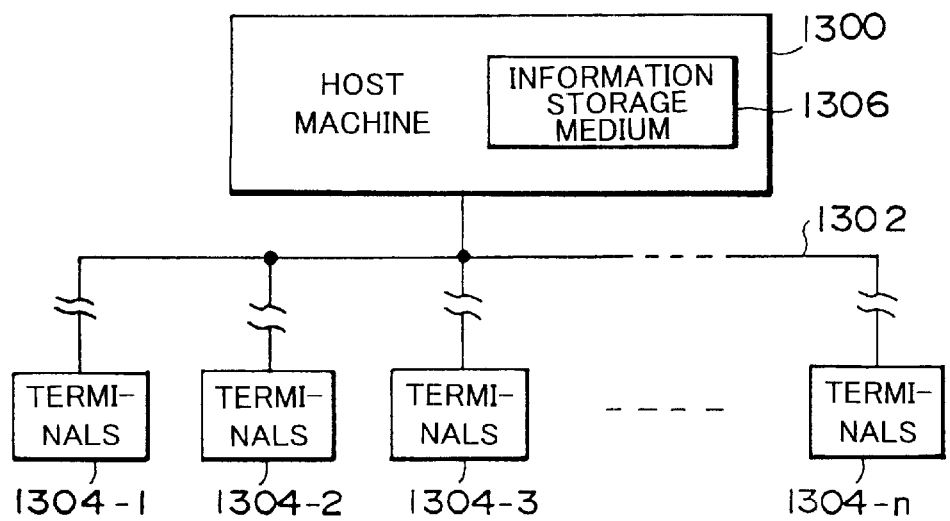

FIG. 12B shows an example wherein this embodiment is applied to a system which includes a host machine 1300 and terminals 1304-1 to 1304-n connected to the host machine 1300 through a communication line 1302 (which may be a small-scale network such as LAN or a global network such as internet). In such a case, the stored information has been stored in a information storage medium 1306 such as magnetic disk device, magnetic tape device, or semiconductor memory which can be controlled by the host machine 1300. Where each of the terminals 1304-1 to 1304-n has CPU, image generation IC and sound processing IC for generating game images and sounds in a stand-alone manner, the terminals 1304-1 to 1304-n receive a game program and so on for generating game images and sounds, from the host machine 1300. On the other hand, if the game images and sounds cannot be generated by the terminals in the stand-alone manner, the host machine 1300 will generate the game images and sounds which are in turn transmitted to the terminals 1304-1 to 1304-n.

In the structure of FIG. 12B, the processing for the present invention may be shared by the host machine and terminals (or by the host machine, terminals and a sever when there is provided a sever). Furthermore, the stored information for realizing the present invention may be divided to be stored in the information storage media of the host machine and terminals (or in the information storage media of the hose machine, terminals and a server if there is a server).

The terminal connected to the communication line may be in the form of either of a domestic or an arcade game machine. When the terminal is an arcade game machine, it is desirable to further connect the terminal with a portable information storage device (which may be in the form of memory card, PDA or portable game machine) which can send and receive information from and to the arcade game machine.

It is to be understood that the present invention is not limited to the aforementioned forms, but may be carried out by any of various other forms.

Although this embodiment has been described as to selection of the normal and time-attack modes, it is to be understood that the present invention is not limited thereto.

Figures 13A, 13B:
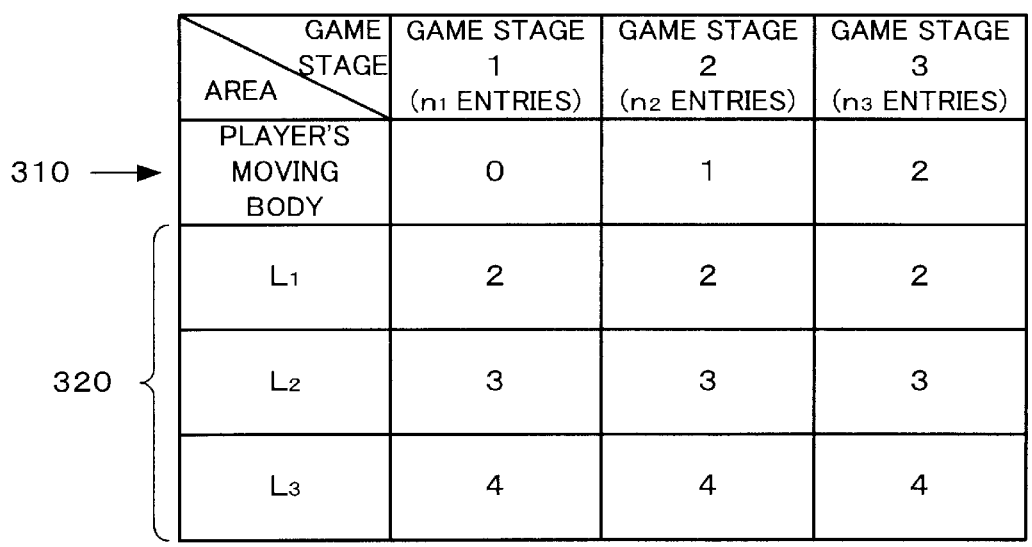
FIGS. 13A and 13B show LOD tables for a plurality of game stages having different numbers of moving-body objects in a game.

FIGS. 13A and 13B show examples of LOD tables used when there are a plurality of game stages which are different from each other in the number of moving-body objects entering the game. If there are three game stages 1, 2 and 3 which are respectively $n_1$, $n_2$ and $n_3$ in number of moving-body objects entering the game ($n_1 < n_2 < n_3$), each game stage has the accuracy information which has been set according to the distances between the moving-body objects and a virtual camera, as shown in FIG. 13A. In this case, the accuracy is set to be higher for a game stage having a reduced number of moving-body objects entering the game, even if the distances are the same. In other words, as shown in FIG. 13A, the accuracy is set to be higher in the order of the game stages 1, 2 and 3.

When the LOD control is carried out in accordance with the number of moving-body objects entering each game stage, the present invention can provide a game machine having a plurality of game stages, which can satisfy the requirements of preventing the occurrence of troubles due to the increased processing burden and providing a high-quality image.

Although FIG. 13A has been described as to setting different accuracies for all the moving-body objects entering each game stage, the present invention is not limited to such a setting. For example, as shown in FIG. 13B, the accuracy may be set only for the player's moving body for each game stage (see 310 in FIG. 13B). The other moving bodies for all the game stages may have a common accuracy (see 320 in FIG. 13B).

FIG. 14 illustrates the setting of accuracy when one game stage has a plurality of play patterns.

For example, if a plurality of races such as preliminary race, semifinal race and final race are performed in the same game stage with the number of moving-body objects being different from one race to the other, it can be considered that the play patterns for these races are also different from each other. In such a case, it is preferable that the accuracies are differently set for the races, as shown in FIG. 14.

The play pattern is determined by the number of moving-body objects in both of the single-player and the multi-player game. For example, when the single-player game has the competition and time-attack modes, if these modes are different in the number of moving-body objects entering the game, it can be the that they have different play patterns. When the moving-body objects corresponding the number of players entering the multi-player game enter that game, the play pattern will be determined by the number of entering players.

Although this embodiment has been described as to a motorcycle as a moving body, the motorcycle may be replaced by a motorcar, jet-ski, boat or the like.

The LOD control of the present invention is not limited to the control of moving-body objects, but may be applied to other types of objects. For example, in a game which has a plurality of game spaces, the game spaces being different from each other in the number of objects which represent the same thing, the LOD control of the present invention can be carried out for such objects.

The present invention may be applied to any of various other game systems such as simulator, large-scaled attraction system in which a number of players enter the game, personal computer, multimedia terminal, game image generation system board and so on, rather than the domestic and arcade game machines.

What is claimed is:

1. A game machine having a plurality of play patterns for a game, said play patterns being different from each other in the number of moving-body objects used in the game, comprising:

an accuracy setting means for setting an accuracy of said moving-body objects for each of said play patterns, the accuracy setting means having a plurality of different settings for setting the accuracy of said moving-body objects, wherein one of the settings is selected according to a play pattern, so that more accurate images of said moving-body objects are generated in the play pattern which has a less number of said moving-body objects in the game; and an image generation means for generating images of said moving-body objects based on the accuracy of said moving-body objects set for each of said play patterns.

2. The game machine as defined in claim 1, wherein said accuracy setting means sets the accuracy of a player's moving body for each of said play patterns, so that a more accurate image of said player's moving body is generated in a play pattern which has a less number of said moving-body objects in the game; and wherein said image generation means generates a more accurate image of said player's moving body in a play pattern which has a less number of said moving-body objects in the game, when in said play patterns the distances between virtual camera and said moving-body objects are the same.

3. A game machine having a plurality of play patterns for a game, said play patterns being different from each other in the number of moving-body objects used in the game, comprising:

a storage means for storing a plurality of items of modeling information which are different from each other in the accuracy of said moving-body objects, wherein one of the items of modeling information is selected according to a play pattern depending on a number of said moving-body objects in the game; and an image generation means for generating images of said moving-body objects by using an item of more accurate modeling information in a play pattern which has a less number of said moving-body objects in the game.

4. The game machine as defined in claim 3, wherein said image generation means generates an image of a player's moving body by using an item of more accurate modeling information in a play pattern which has a less number of said moving-body objects in the game.

5. The game machine as defined in claim 1, further comprising a selecting means for selecting a desired play pattern from said plurality of play patterns for the game.

6. The game machine as defined in claim 3, further comprising a selecting means for selecting a desired play pattern from said plurality of play patterns for the game.

7. The game machine as defined in claim 1, wherein the game machine enables a player to play a multi-player game; and generates more accurate images of said moving-body objects in the multi-player game which has less number of players.

8. The game machine as defined in claim 3, wherein the game machine enables a player to play a multi-player game; and generates more accurate images of said moving-body objects in the multi-player game which has less number of players.

9. A game machine which provides a plurality of game spaces for a game, said game spaces being different from each other in the number of objects, comprising:

an accuracy setting means for setting an accuracy of said objects for each of said game spaces in accordance with a number of said objects, the accuracy setting means having a plurality of different settings for setting the accuracy of said objects, wherein one of the settings is selected according to number of objects in a game space; and an image generation means for generating images of said objects based on the accuracy of said objects for each of said game spaces, wherein said image generation means generates more accurate images of said objects disposed in one of said game spaces which has less number of objects.

10. The game machine as defined in claim 1, wherein said image generation means generates a more accurate image of an object by using a model which has a larger number of polygons selected from among a plurality of models which are used to generate an image of said object, said plurality of models having different number of polygons.

11. The game machine as defined in claim 3, wherein said image generation means generates a more accurate image of an object by using a model which has a larger number of polygons selected from among a plurality of models which are used to generate objects an image of said object, said plurality of models having different number of polygons.

12. The game machine as defined in claim 9, wherein said image generation means generates a more accurate image of an object by using a model which has a larger number of polygons selected from among a plurality of models which are used to generate an image of said object, said plurality of models having different number of polygons.

13. A computer-readable information storage medium for storing information which controls a game machine having a plurality of play patterns for a game, said play patterns being different from each other in the number of moving-body objects used in the game, said information storage medium comprising information for implementing:

an accuracy setting means for setting an accuracy of said moving-body objects for each of said play patterns, the accuracy setting means having a plurality of different settings for setting the accuracy of said moving-body objects, wherein one of the settings is selected according to a game pattern, so that more accurate images of said moving-body objects are generated in the play pattern which has less number of said moving-body objects in the game; and an image generation means for generating images of said moving-body objects based on the accuracy of said moving-body objects set for each of said play patterns.

14. The computer-readable information storage medium as defined in claim 13, further comprising:

information for said accuracy setting means to set the accuracy of a player's moving body for each of said play patterns, so that a more accurate image of said player's moving body is generated in a play pattern which has a less number of said moving-body objects in the game; and information for said image generation means to generate a more accurate image of said player's moving body in a play pattern which has a less number of said moving-body objects in the game, when in said play patterns the distances between a virtual camera and said moving-body objects are the same.

15. A computer-readable information storage medium for controlling a game machine having a plurality of play patterns for a game, said play patterns being different from each other in the number of moving-body objects used in the game, said information storage medium comprising:

a plurality of items of modeling information which are different from each other in accuracy of said moving-body objects, wherein one of the items of modeling information is selected according to a play pattern, depending on a number of said moving body objects in the game; and information for generating images of said moving-body objects by using an item of more accurate modeling information in a play pattern which has a less number of said moving-body objects in the game.

16. The computer-readable information storage medium as defined in claim 15, further comprising information for generating an image of a player's moving body by using an item of more accurate modeling information in a play pattern which has a less number of said moving-body objects in the game.

17. The computer-readable information storage medium as defined in claim 13, further comprising information for implementing a selecting means for selecting a desired play pattern from said plurality of play patterns for the game.

18. The computer-readable information storage medium as defined in claim 15, further comprising information for implementing a selecting means for selecting a desired play pattern from said plurality of play patterns for the game.

19. The computer-readable information storage medium as defined in claim 13, further comprising information for generating more accurate images of said moving-body objects in a multi-player game which has less number of players.

20. The computer-readable information storage medium as defined in claim 15, further comprising information for generating more accurate images of said moving-body objects in a multi-player game which has less number of players.

21. A computer-readable information storage medium for storing information for controlling a game machine which provides a plurality of game spaces for a game, said game spaces being different from each other in the number of objects, said information storage medium comprising information:

for implementing an accuracy setting means for setting an accuracy of said objects for each of said game spaces in accordance with the number of said objects, the accuracy setting means having a plurality of different settings for setting the accuracy of said moving-body objects, wherein one of the settings is selected according to number of objects in a game space;

for implementing an image generation means for generating images of said—objects based on the accuracy of said objects for each of said game spaces; and for said image generation means to generate more accurate images of said objects in a game space which has less number of objects.

22. The computer-readable information storage medium as defined in claim 13, further comprising:

information for said image generation means to generate a more accurate image of an object by using a model which has a larger number of polygons selected from among a plurality of models which are used to generate an image of said object, said plurality of models having different number of polygons.

23. The computer-readable information storage medium as defined in claim 15, further comprising:

information for said image generation means to generate a more accurate image of an object by using a model which has a larger number of polygons selected from among a plurality of models which are used to generate an image of said object, said plurality of models having different number of polygons.

24. The computer-readable information storage medium as defined in claim 21, further comprising:

information for said image generation means to generate a more accurate image of an object by using a model which has a larger number of polygons selected from among a plurality of models which are used to generate an image of said object, said plurality of models having different number of polygons.

25. A game machine comprising:

an accuracy setting means for setting an accuracy of said moving-body objects, the accuracy setting means having a plurality of different settings for setting the accuracy of said moving-body objects, wherein one of the settings is selected according to a number of said moving-body objects in a game, so that more accurate images of said moving-body objects are generated when there is a less number of said moving-body objects in the game; and an image generation means for generating images of said moving-body objects based on the accuracy of said moving-body objects settings.

26. The game machine as defined in claim 25, wherein said accuracy setting means sets the accuracy of a player's moving body so that a more accurate image of said player's moving-body is generated when there is a less number of said moving-body objects in the game; and wherein said image generation means generates a more accurate image of said player's moving body when there is a less number of said moving-body objects in the game, where the distances between a virtual camera and said moving-body objects are the same.

27. A game machine comprising:

a storage means for storing a plurality of items of modeling information which are different from each other in the accuracy of said moving-body objects, wherein one of the items of modeling information is selected according to the number of said moving-body objects in a game; and an image generation means for generating images of said moving-body objects by using an item of more accurate modeling information when less moving-body objects are present in a game.

28. The game machine as defined in claim 27, wherein said image generation means generates an image of a player's moving body by using an item of more accurate modeling information, when less moving-body objects are present in the game.

29. A method of operating a game machine comprising:

selecting one of settings for setting an accuracy of moving-body objects from a plurality of setting, the setting selected such that more accurate images of moving-body objects are generated when there is a less number of said moving-body objects in a game;

setting an accuracy of said moving-body objects according to said selected setting;

and generating images of said moving-body objects based on said accuracy of said moving-body objects.

30. The method as defined in claim 29, setting an accuracy and generating images include:

setting an accuracy of a player's moving body so that a more accurate image of said player's moving-body is generated when there is a less number of said moving-body objects in the game; and generating a more accurate image of said player's moving body when there is a less number of said moving-body objects in the game, where the distances between a virtual camera and said moving-body objects are the same.

31. A method of operating a game machine comprising:

storing a plurality of items of modeling information which are different from each other in accuracy of said moving-body objects;

selecting an item of modeling information from a plurality of items of modeling information for a moving-body object, the item selected according to a number of said moving-body objects in a game; and generating images of said moving-body objects by using an item of more accurate modeling information when less moving-body objects are present in a game.

32. The method as defined in claim 31, wherein generating images include generating an image of a player's moving body by using an item of more accurate modeling information when less moving-body objects are present in the game.

33. A method for operating a game machine having a plurality of play patterns for a game, said play patterns being different from each other in the number of moving-body objects used in the game, the method comprising:

selecting one of settings according to a play pattern from a plurality of different settings for setting accuracy of said moving-body objects, one of the settings is selected so that more accurate images of said moving-body objects are generated in the play pattern which has a less number of said moving-body objects in the game; and generating images of said moving-body objects based on the accuracy of said moving-body objects set for each of said play patterns.

34. The method as defined in claim 33, further comprising:

setting an accuracy of a player's moving body for each of said play patterns, so that a more accurate image of said player's moving body is generated in a play pattern which has a less number of said moving-body objects in the game; and generating a more accurate image of said player's moving body in a play pattern which has a less number of said moving-body objects in the game, when in said play patterns the distances between virtual camera and said moving-body objects are the same.

35. The method of operating a game machine having a plurality of play patterns for a game, said play patterns being different from each other in the number of moving-body objects used in the game, the method comprising:

storing a plurality of items of modeling information which are different from each other in accuracy of said moving-body objects;

selecting one of the items of modeling information according to a play pattern depending on a number of said moving-body objects in the game; and generating images of said moving-body objects by using an item of more accurate modeling information in a play pattern which has a less number of said moving-body objects in the game.

36. The method as defined in claim 35, further comprising:

generating an image of a player's moving body by using an item of more accurate modeling information in a play pattern which has a less number of said moving-body objects in the game.

37. The method as defined in claim 33, further comprising:

selecting a desired play pattern from said plurality of play patterns for the game.

38. The method as defined in claim 35, further comprising:

selecting a desired play pattern from said plurality of play patterns for the game.

39. The method as defined in claim 33, further comprising:

enabling a player to play a multi-player game; and generating more accurate images of said moving-body objects in the multi-player game which has less number of players.

40. The method as defined in claim 35, further comprising:

enabling a player to play a multi-player game; and generating more accurate images of said moving-body objects in the multi-player game which has less number of players.

41. The method of operating a game machine which provides a plurality of game spaces for a game, said game spaces being different from each other in the number of objects, the method comprising:

selecting one of settings according to number of objects in a game space from a plurality of different settings for setting an accuracy of said objects for each of said game spaces in accordance with a number of said objects; and generating images of said objects based on the accuracy of said objects for each of said game spaces, wherein more accurate images of said objects are generated in one of said game spaces which has less number of objects.

42. The method as defined in claim 33, further comprising:

generating a more accurate image of an object by using a model which has a larger number of polygons selected from among a plurality of models which are used to generate an image of said object, said plurality of models having different number of polygons.

43. The method as defined in claim 35, further comprising:

generating a more accurate image of an object by using a model which has a larger number of polygons selected from among a plurality of models which are used to generate an image of said object, said plurality of models having different number of polygons.

44. The method as defined in claim 41, further comprising:

generating a more accurate image of an object by using a model which has a larger number of polygons selected from among a plurality of models which are used to generate an image of said object, said plurality of models having different number of polygons.

* * * * *